United States Patent
Yi et al.

(10) Patent No.: US 7,363,047 B2
(45) Date of Patent: Apr. 22, 2008

(54) APPARATUS AND METHOD FOR ESTABLISHING FEEDBACK IN A BROADCAST OR MULTICAST SERVICE

(75) Inventors: Seung June Yi, Seoul (KR); Young Dae Lee, Kyoungki-do (KR); Sung Duck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 480 days.

(21) Appl. No.: 10/841,589

(22) Filed: May 7, 2004

(65) Prior Publication Data

US 2004/0224698 A1 Nov. 11, 2004

(30) Foreign Application Priority Data

May 9, 2003 (KR) .................. 10-2003-0029469

(51) Int. Cl.
*H04B 7/00* (2006.01)
*H04Q 7/20* (2006.01)
(52) U.S. Cl. .................. 455/515; 455/509; 455/450; 455/518; 370/400; 370/432; 370/464
(58) Field of Classification Search ............... 455/509, 455/515, 435.1, 426.1, 450, 517, 422.1, 414.1, 455/412.2, 414.3, 518, 519; 370/230, 235, 370/252, 254, 400, 432, 464, 444; 725/132, 725/140, 50
See application file for complete search history.

(56) References Cited

U.S. PATENT DOCUMENTS

| | | | |
|---|---|---|---|
| 6,006,091 A * | 12/1999 | Lupien ..................... 455/435.1 |
| 6,360,076 B1 * | 3/2002 | Segura et al. ............ 455/67.11 |
| 6,396,814 B1 * | 5/2002 | Iwamura et al. ............ 370/256 |
| 7,054,630 B2 * | 5/2006 | Nagpal et al. .............. 455/434 |
| 2001/0010685 A1 * | 8/2001 | Aho ........................... 370/329 |
| 2002/0044634 A1 * | 4/2002 | Rooke et al. ............. 379/93.01 |
| 2003/0223394 A1 * | 12/2003 | Parantainen et al. ........ 370/336 |
| 2004/0127243 A1 * | 7/2004 | Sarkkinen .................... 455/511 |
| 2004/0157640 A1 * | 8/2004 | Pirskanen et al. ........ 455/552.1 |
| 2004/0181550 A1 * | 9/2004 | Warsta et al. ............. 707/104.1 |

(Continued)

FOREIGN PATENT DOCUMENTS

EP 1091601 A2 4/2001

(Continued)

*Primary Examiner*—Matthew Anderson
*Assistant Examiner*—Sujatha Sharma
(74) *Attorney, Agent, or Firm*—Lee, Hong, Degerman, Kang & Schmadeka

(57) ABSTRACT

A method and apparatus for establishing feedback channels in an MBMS (multimedia broadcast/multicast service) for UMTS (Universal Mobile Telecommunication System) by selectively establishing RRC connections with terminals that are capable of transmitting uplink feedback information regarding the particular MBMS service. When requesting an RRC connection, a terminal sends an RRC connection message including information related to MBMS and the UTRAN selectively establishes an RRC connection with the terminal based on the information related to MBMS. The terminal indicates whether both a point-to-multipoint radio bearer and a point-to-point radio bearer can be received and, optionally, provides terminal class information in the RRC connection request message. The UTRAN gives higher priority to those terminals that indicate the capability to receive both a point-to-multipoint radio bearer and a point-to-point radio bearer when selecting terminals with which to establish an RRC connection, thereby maximizing feedback information regarding a particular MBMS service.

36 Claims, 11 Drawing Sheets

U.S. PATENT DOCUMENTS

| | | | |
|---|---|---|---|
| 2004/0190469 A1* | 9/2004 | Pekonen et al. | 370/328 |
| 2004/0224669 A1* | 11/2004 | Pedlar et al. | 455/412.1 |
| 2005/0015583 A1* | 1/2005 | Sarkkinen et al. | 713/150 |
| 2005/0043020 A1* | 2/2005 | Lipsanen et al. | 455/422.1 |
| 2006/0156370 A1* | 7/2006 | Parantainen | 725/132 |

FOREIGN PATENT DOCUMENTS

| | | |
|---|---|---|
| EP | 1 209 940 A1 | 5/2002 |
| KR | 10-2002-0088225 A | 11/2002 |
| KR | 10-2003-0032875 A | 4/2003 |
| KR | 10-2003-0079632 A | 10/2003 |
| WO | WO 01/93607 A1 | 12/2001 |

* cited by examiner

APPARATUS AND METHOD FOR ESTABLISHING FEEDBACK IN A BROADCAST OR MULTICAST SERVICE

CROSS-REFERENCE TO RELATED APPLICATIONS

Pursuant to 35 U.S.C. § 119(a), this application claims the benefit of earlier filing date and right of priority to Korean Application No. 2003-0029469, filed on May 9, 2003, the contents of which is hereby incorporated by reference herein in its entirety.

BACKGROUND OF THE INVENTION

1. Field of the Invention

The present invention relates to a method and apparatus for establishing feedback channels in an MBMS (multimedia broadcast/multicast service) for UMTS (Universal Mobile Telecommunication System) and, more particularly, a method for selectively establishing an RRC connection with the terminals that are capable of transmitting uplink feedback information regarding the particular MBMS service.

2. Description of the Related Art

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology.

In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology. In order to achieve rapid and efficient technical development of the UMTS, five technical specification groups (TSG) have been created within the 3GPP for standardizing the UMTS by considering the independent nature of the network elements and their operations.

Each TSG develops, approves, and manages the standard specification within a related region. Among these groups, the radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 illustrates an exemplary basic structure of a general UMTS network. As shown in FIG. 1, the UMTS is roughly divided into a terminal or user equipment (UE) 10, a UTRAN 20, and a core network (CN) 30.

The UTRAN 20 includes one or more radio network sub-systems (RNS) 25. Each RNS 25 includes a radio network controller (RNC) 23 and a plurality of Node-Bs (base stations) 21 managed by the RNC 23. The RNC 23 handles the assignment and management of radio resources and operates as an access point with respect to the core network 30.

The Node-Bs 21 receive information sent by the physical layer of the terminal 10 through an uplink and transmit data to the terminal 10 through a downlink. The Node-Bs 21 operate as access points of the UTRAN 20 for the terminal 10.

The UTRAN 20 constructs and maintains a radio access bearer (RAB) for communication between the terminal 10 and the core network 30. The core network 30 requests end-to-end quality of service (QoS) requirements from the RAB, and the RAB supports the QoS requirements the core network 30 has set. Accordingly, by constructing and maintaining the RAB, the UTRAN 20 can satisfy the end-to-end QoS requirements.

The services provided to a specific terminal 10 are roughly divided into the circuit switched (CS) services and the packet switched (PS) services. For example, a general voice conversation service is a circuit switched service, while a Web browsing service via an Internet connection is classified as a packet switched (PS) service.

For supporting circuit switched services, the RNCs 23 are connected to the mobile switching center (MSC) 31 of the core network 30 and the MSC 31 is connected to the gateway mobile switching center (GMSC) 33 that manages the connection with other networks. For supporting packet switched services, the RNCs 23 are connected to the serving general packet radio service (GPRS) support node (SGSN) 35 and the gateway GPRS support node (GGSN) 37 of the core network 30. The SGSN 35 supports the packet communications with the RNCs 23 and the GGSN 37 manages the connection with other packet switched networks, such as the Internet.

FIG. 2 illustrates a structure of a radio interface protocol between the terminal 10 and the UTRAN 20 according to the 3GPP radio access network standards. As shown in FIG. 2, the radio interface protocol has horizontal layers comprising a physical layer, a data link layer, and a network layer, and has vertical planes comprising a user plane (U-plane) for transmitting user data and a control plane (C-plane) for transmitting control information.

The user plane is a region that handles traffic information with the user, such as voice or Internet protocol (IP) packets. The control plane is a region that handles control information for an interface with a network, maintenance and management of a call, and the like.

The protocol layers in FIG. 2 can be divided into a first layer (L1), a second layer (L2), and a third layer (L3) based on the three lower layers of an open system interconnection (OSI) standard model.

The first layer (L1), namely, the physical layer, provides an information transfer service to an upper layer by using various radio transmission techniques. The physical layer is connected to an upper layer called a medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels and provides allocation of the MAC parameters for allocation and re-allocation of radio resources. The MAC layer is connected to an upper layer called the radio link control (RLC) layer, via a logical channel.

Various logical channels are provided according to the type of information transmitted. In general, a control channel is used to transmit information of the control plane and a traffic channel is used to transmit information of the user plane.

A logical channel may be a common channel or a dedicated channel depending on whether the logical channel is shared. Logical channels include a dedicated traffic channel (DTCH), a dedicated control channel (DCCH), a common traffic channel (CTCH), a common control channel (CCCH), a broadcast control channel (BCCH), and a paging control channel (PCCH). The BCCH provides information including information utilized by a terminal 10 to access a system. The PCCH is used by the UTRAN 20 to access a terminal 10.

The MAC layer is connected to the physical layer by transport channels and can be divided into a MAC-b sub-layer, a MAC-d sub-layer, a MAC-c/sh sub-layer, and a MAC-hs sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals. The MAC-d sub-layer manages a dedicated channel (DCH), which is a dedicated transport channel for a specific terminal 10. Accordingly, the MAC-d sublayer is located in a serving RNC (SRNC) that manages a corresponding terminal, and one MAC-d sublayer also exists in each terminal.

The RLC layer supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity and then creates data units by adding header information thereto. The data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals 10 positioned in a specific cell or cells.

The PDCP layer is located above the RLC layer. The PDCP layer is used to transmit network protocol data, such as the IPv4 or IPv6, effectively on a radio interface with a relatively small bandwidth. For this purpose, the PDCP layer reduces unnecessary control information used in a wired network, a function called header compression.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal 10 and the UTRAN 20. In general, the set up of the RB refers to the process of stipulating the characteristics of a protocol layer and a channel required for providing a specific data service, and setting the respective detailed parameters and operation methods.

The RRC state refers to whether there exists a logical connection between the RRC of the terminal 10 and the RRC of the UTRAN 20. If there is a connection, the terminal 10 is said to be in RRC connected state. If there is no connection, the terminal 10 is said to be in idle state.

Because an RRC connection exists for terminals 10 in RRC connected state, the UTRAN 20 can determine the existence of a particular terminal within the unit of cells, for example which cell the RRC connected state terminal is in. Thus, the terminal 10 can be effectively controlled.

In contrast, the UTRAN 20 cannot determine the existence of a terminal 10 in idle state. The existence of idle state terminals 10 can only be determined by the core network 30 to be within a region that is larger than a cell, for example a location or a routing area. Therefore, the existence of idle state terminals 10 is determined within large regions, and, in order to receive mobile communication services such as voice or data, the idle state terminal must move or change into the RRC connected state.

The 3GPP system can provide multimedia broadcast multicast service (MBMS), which is a new type of service in Release 6. The 3GPP TSG SA (Service and System Aspect) defines various network elements and their functions required for supporting MBMS services. A cell broadcast service provided by the conventional Release 99 is limited to a service in which text type short messages are broadcast to a certain area. The MBMS service provided by Release 6 is a more advanced service that multicasts multimedia data to terminals (UEs) 10 that have subscribed to the corresponding service in addition to broadcasting multimedia data.

The MBMS service is a downward-dedicated service that provides a streaming or background service to a plurality of terminals 10 by using a common or dedicated downward channel. The MBMS service is divided into a broadcast mode and a multicast mode.

The MBMS broadcast mode facilitates transmitting multimedia data to every user located in a broadcast area, whereas the MBMS multicast mode facilitates transmitting multimedia data to a specific user group located in a multicast area. The broadcast area signifies a broadcast service available area and the multicast area signifies a multicast service available area.

FIG. 3 illustrates a process of providing a particular MBMS service (service 1) by using multicast mode. Users who desire to receive the MBMS service, for example UE1 and UE2, first receive a service announcement provided by a network. The service announcement provides the terminal 10 with a list of services to be provided and related information. In addition, the users must receive a service notification provided by the network. The service notification provides the terminal 10 with information related to the broadcast data to be transmitted.

If the user intends to receive the multicast mode MBMS service, the user subscribes to a multicast subscription group. A multicast subscription group is a group of users who have completed a subscription procedure. Once a user has subscribed to the multicast subscription group, the user can join a multicast group to receive a specific multicast service. A multicast group is a group of users that receive a specific multicast service. Joining a multicast group, also referred to as MBMS multicast activation, involves merging with the multicast group that has users who wish to receive the specific multicast service. Accordingly, the user can receive the specific multicast data by joining a multicast group, referred to as MBMS multicast activation. Each terminal 10 may individually subscribe to a multicast subscription group and join or leave a multicast group before, during, or any time after data transmission.

While a particular MBMS service is in progress, one or more sessions for that service may occur in sequence. When data to be transmitted for a particular MBMS service is generated at the MBMS data source, the core network 30 indicates the start of a session to the RNC 23. In contrast, when there is no further data to be transmitted for a particular MBMS service, the core network 30 indicates a session stop to the RNC 23.

Between session start and session stop, data transmission for the particular MBMS service is performed. Only those terminals 10 that have joined a multicast group for the MBMS service may receive data that during the data transmission.

In the session start procedure, the UTRAN 20 that received the session start from the core network 30 transmits an MBMS notification to the terminals 10. MBMS notification involves to UTRAN 20 informing the terminal 10 that transmission of data for a particular MBMS service within a certain cell is impending.

The UTRAN 20 can use the MBMS notification procedure to perform a counting operation that determines the number of terminals 10 that wish to receive a particular MBMS service within a particular cell. The counting procedure is used to determine whether the radio bearer for providing the particular MBMS service should be set as point-to-multipoint or point-to-point.

To select the MBMS radio bearer, the UTRAN 20 internally establishes a threshold value. After performing the counting function, the UTRAN 20 may set a point-to-point MBMS radio bearer if the number of terminals 10 existing within the corresponding cell is smaller than a threshold value and may set a point-to-multipoint MBMS radio bearer if the number of terminals existing within the corresponding cell is greater than or equal to the threshold value.

When a point-to-point radio bearer is set for a particular service, the terminals 10 wishing to receive the corresponding service are all in an RRC connected state. However, when a point-to-multipoint radio bearer is set for a particular service, all the terminals 10 wishing to receive the corresponding service need not be in an RRC connected state since terminals in an idle state may also receive the point-to-multipoint radio bearer.

The MBMS service transmitting multimedia data by broadcast or multicast may employ RTP (Real-time Transport Protocol) for transmitting packets in real-time. RTP is a protocol made appropriately for transmitting data having real-time characteristics, such as audio or video, over a multicast network or a unicast network. When using RTP for transmitting data in real-time on the downlink, an RTCP (RTP Control Protocol) that controls the downlink transmission of real-time data can be used for the uplink.

In MBMS, uplink RTCP packet transmissions are performed through a point-to-point radio bearer, which is different from the MBMS radio bearer used in transmitting downlink RTP packet transmissions. The main function of RTCP is to provide feedback of condition information regarding data allocation that is related to flow control and congestion control of other protocols. More specifically, the RTCP packets indicate an amount of RTP packets that are lost during transmission from the source to the final destination. This information is used for controlling the size of the RTP packets and for finding an appropriate encoding method.

In the related art, when a point-to-multipoint radio bearer is set for a particular service within a particular cell, the UTRAN 20 may allow some terminals 10 to stay in RRC connected state based upon radio resource managing conditions while requiring the remaining terminals to be in idle state. For example, when the UTRAN 20 receives an RRC connection request message from the terminals 10 wishing to receive a particular service, RRC connection setup messages are sent to a limited number of terminals according to the radio resource managing conditions for controlling the reception of the corresponding service in RRC connected state. RRC connection reject messages are transmitted to the other terminals 10 so that these terminals may receive the corresponding service in idle state.

FIG. 4 illustrates a signal flow chart indicating successful RRC connection setup according to the conventional art. After an MBMS session start message is received from the core network 30 in step S50, the UTRAN 20 transmits an MBMS notification message to those terminals 10 wishing to receive the corresponding MBMS service in step S52 to indicate that data transmission for the particular MBMS service is impending.

Each terminal 10 that receives the MBMS notification message transmits an RRC connection request message to the UTRAN 20 in step S54. The UTRAN 20 considers the current condition of radio resources and determines, in step S56, which RRC connections should be granted with a limited number of terminals 10 below a threshold value.

In selecting which terminals 10 to grant an RRC connection, the UTRAN 20 randomly or sequentially selects terminals wishing to receive the MBMS service, for example on a first-come-first-served basis. The UTRAN 20 adjusts the total number of terminals 10 granted RRC connections to be at the threshold value and then establishes RRC connections.

In step S58 the UTRAN 20 transmits RRC connection setup messages to the terminals selected for RRC connection. The terminals that receive the RRC connection setup message then transmit an RRC connection setup complete message to the UTRAN 20 in step S60. Upon successfully completing this procedure, an RRC connection exists between each selected terminal 10 and the UTRAN 20 and each selected terminal is in RRC connected state. In step S62, the UTRAN allows those terminals not selected for RRC connection that desire to receive the MBMS service to set up a point-to-multipoint MBMS bearer.

FIG. 5 illustrates a signal flow diagram showing unsuccessful RRC connection setup according to the conventional art. After an MBMS session start message is received from the core network 30 in step S50, the UTRAN 20 transmits an MBMS notification message to those terminals 10 wishing to receive the corresponding MBMS service in step S52 to indicate that data transmission for the particular MBMS service is impending.

Each terminal 10 that receives the MBMS notification transmits an RRC connection request message to the UTRAN 20 in step S54. The UTRAN 20 considers the current condition of radio resources and determines, in step S56, which RRC connections should be granted with a limited number of terminals 10 below a threshold value.

As illustrated in FIG. 5, the UTRAN 20 determines that RRC connections should not be granted for those terminals 10 that exceed the threshold value, for example any terminal counted after the number of terminals reached the threshold value. The UTRAN 20 transmits, in step S59, RRC connection reject messages to those terminals determined not to require an RRC connection. The terminals receiving an RRC connection reject message are in idle state. In step S62, the UTRAN allows those terminals not selected for RRC connection that desire to receive the MBMS service to set up a point-to-multipoint MBMS bearer.

As illustrated in FIGS. 4 and 5, when a point-to-multipoint radio bearer is provided for a particular service within a particular cell, some terminals 10 desiring to receive the service are in RRC connected state, while the remaining terminals are in idle state. If feedback information is required for the MBMS service and the MBMS service is provided on the downlink using RTP and is received on the uplink using RTCP, only those terminals in RRC connected state may transmit feedback information because transmission of feedback information employs a point-to-point radio bearer and only terminals in RRC connected state may establish a point-to-point radio bearer.

Furthermore, in order to transmit feedback information, such as RTCP, while receiving MBMS service, the terminal 10 must be able to simultaneously receive both the point-to-multipoint radio bearer and the point-to-point radio bearer. Therefore, even a terminal 10 in RRC connected state cannot transmit feedback information regarding the MBMS service if the terminal cannot simultaneously receive both a point-to-multipoint radio bearer and a point-to-point radio bearer.

In general, for MBMS service, the radio network should control the downlink MBMS data transmission using uplink feedback information from a plurality of terminals 10. For downlink MBMS data transmission, it is desirable that feedback information be received from as many terminals 10 as possible because the conditions for all terminals must be considered.

Only those terminals 10 that are in RRC connected state and can simultaneously receive both a point-to-multipoint and a point-to-point radio bearer may transmit uplink feedback information. Therefore, considering the limited amount of radio resources, it is preferable that the radio network first establishes an RRC connection with those terminals 10 that are able to simultaneously receive both a point-to-multipoint and a point-to-point radio bearer. Furthermore, considering that the feedback information of one or more terminals 10 effect MBMS data transmissions, the radio network should give priority to the terminals for "high-end" users, for example users with expensive mobile phones with feedback functions, when determining which terminals are granted RRC connections so that feedback information transmitted from the terminals of such "high-end" users is always considered when providing MBMS services to various users.

However, prior to sending an RRC connection setup message, the radio access network, for example a UTRAN 20 of the conventional art, cannot tell whether a terminal 10 is able to simultaneously receive both a point-to-multipoint and a point-to-point radio bearer. In the conventional art, the UTRAN 20 randomly or sequentially selects the terminals to receive RRC connections from the terminals that have sent RRC connection request messages, for example on a first-come-first-served basis. Therefore, feedback capability is not considered when selecting the terminals to receive RRC connections in the conventional art.

Therefore, there is a need for a method and apparatus that facilitates the consideration of a terminal's ability to provide feedback when determining which terminals will receive RRC connections. The present invention addresses this and other needs.

SUMMARY OF THE INVENTION

The present invention is directed to a to a method and apparatus for establishing feedback channels in an MBMS (multimedia broadcast/multicast service) for UMTS (Universal Mobile Telecommunication System) that facilitates selectively establishing an RRC connection with the terminals that are capable of transmitting uplink feedback information regarding the particular MBMS service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a mobile communication system and device that facilitates selectively establishing an RRC connection with terminals that are capable of transmitting uplink feedback information regarding a particular MBMS service. Specifically, a method and apparatus is provided that allows the UTRAN to consider a terminal's ability to provide feedback when determining which terminals will receive RRC connections. Although the invention is described herein with regard to a UMTS developed by the 3GPP, it is contemplated that the methods and apparatus of the present invention may be applied whenever it is desired to provide information regarding a terminal's capabilities before an RRC connection is established.

In one aspect of the present invention, a method is provided for a terminal in radio communication with a network. The method includes receiving a connection message while the terminal is in an idle state, transmitting a connection request message including feedback capability information to the network, and receiving a connection response message from the network.

Preferably the connection message is associated with a user service, for example an MBMS notification message associated with a point-to-multipoint MBMS service, and requests that the terminal provide an indication of the terminal's feedback capability. The feedback capability information indicates whether the terminal is capable of supporting reception of the user service and transmission of feedback associated with the service.

The connection request message is the first message transmitted by the terminal, for example upon introduction into a cell, and includes feedback capability information. Preferably the connection request message is an RRC connection request associated with the service that seeks an RRC connection and the service is an MBMS multicast service.

The feedback capability information allows the network to avoid establishing connections with terminals that are not capable of providing feedback information until connections are established with all the terminals that are capable of providing feedback information. In this way, the feedback capability of subscribing terminals may be maximized.

The connection request message may also include terminal class information. Terminal class information allows the network to establish a priority for terminals that are better equipped or for users that pay a higher subscription fee when the number of subscribing terminals is such that a connection is not established with all terminals.

The connection response message may contain connection setup information indicating that the terminal's connection request is granted or connection reject information indicating that the terminal's connection request was rejected. Preferably the connection response message is either an RRC connection setup message or an RRC connection reject message.

If the terminal's connection request is granted, the terminal enters a connected state. If the terminal is capable of supporting reception of the user service and transmission of feedback associated with the service, a point-to-multipoint downlink channel and a bi-directional point-to-point feedback channel are established. Preferably, the establishment a point-to-multipoint downlink channel and a bi-directional point-to-point feedback channel involve RRC connections. If the terminal's connection request is rejected, the terminal remains in an idle state.

In another aspect of the present invention, a method is provided for communicating with a network in wireless communication system. The method includes a terminal with no control plane connection to a network initiating a control plane connection procedure by transmitting a connection request message to request a connection response message from the network, the connection request message including information indicating whether the terminal is capable of supporting reception of multiple channels, and receiving a connection response message from the network that includes either connection setup information or connection reject information.

Preferably the terminal capability information also indicates the terminal's ability to transmit feedback associated with a user service, such as a point-to-multipoint MBMS service. The connection request message is preferably associated with the service and may also include terminal class information.

The connection response message may contain connection setup information indicating that the terminal's connection request is granted or connection reject information indicating that the terminal's connection request was rejected. If the terminal's connection request is granted, the terminal enters a connected state. If the terminal is capable of supporting reception of the user service and transmission of feedback associated with the service, a point-to-multipoint downlink channel and a bi-directional point-to-point feedback channel are established. If the terminal's connection request is rejected, the terminal remains in an idle state.

In another aspect of the present invention, a method is provided for a network in radio communication with a plurality of terminals. The method includes transmitting a connection message to a plurality of terminals subscribing to a service while the terminals are in an idle state, receiving connection request messages including feedback capability information from the plurality of terminals, selecting a predetermined number of terminals with which to establish a network connection with priority given to those terminals which can provide feedback information associated with the service, and transmitting a connection response message including connection setup information to each selected terminal.

The feedback capability information included in the connection request messages may be either positive feedback capability information or negative feedback capability information. Positive feedback capability information indicates that the terminal is capable of supporting simultaneous reception of the service and transmission of feedback associated with the service. Negative feedback capability information indicates that the terminal is not capable of supporting simultaneous reception of the service and transmission of feedback associated with the service.

When selecting the terminals with which to establish a network connection, the number of terminals sending positive feedback information will be counted. Terminals that sent positive feedback information will be selected for network connection ahead of terminals that sent negative feedback information when network connections are established with a threshold number of terminals. In this way, network connections with terminals that are capable of providing feedback information associated with the service are maximized. Terminals that sent negative feedback information will be selected for network connection only if there are an insufficient number of terminals that sent positive feedback information to reach the threshold.

If there are a sufficient number of terminals that sent positive feedback information to meet the threshold requirement for establishing a network connection, no terminals that sent negative feedback information will be selected for network connection. If there are more terminals that sent positive feedback information than there are allowable network connections, not all the terminals that sent positive feedback information will be selected for network connection. In this case, terminals that sent positive feedback information may be selected randomly or sequentially, for example on a first-come-first-served basis.

It is further contemplated that the selection of terminals that sent positive feedback information may be performed according to terminal class. The terminal class information, such as an access class or access service class, is used to rank the terminals. The selection of terminals for network connection is then performed on the basis of rank, with the terminals having higher relative rank selected over terminals having lower relative rank. Terminal class information may be received from the core network or may be included in the connection request messages from the terminals.

If there are not a sufficient number of terminals that sent positive feedback information to meet the threshold requirement for establishing a network connection, some terminals that sent negative feedback information will also be selected for network connection. In this case, terminals which sent negative feedback information may be selected randomly or sequentially, for example on a first-come-first-served basis.

It is further contemplated that the selection of terminals that sent negative feedback information may be performed according to terminal class. The terminal class information, such as an access class or access service class, is used to rank the terminals. The selection of terminals for network connection is then performed on the basis of rank, with the terminals having higher relative rank selected over terminals having lower relative rank. Terminal class information may be received from the core network or may be included in the connection request messages from the terminals.

Preferably the connection message is associated with a user service, for example an MBMS notification message associated with a point-to-multipoint MBMS service, and requests that the terminal provide an indication of the terminal's feedback capability. Preferably the connection request message is an RRC connection request associated with the service that seeks an RRC connection and the service is an MBMS multicast service.

A connection response message including connection reject information is sent to each non-selected terminal. Preferably the connection response message including connection setup information is an RRC connection setup message and the connection response message including connection reject information is an RRC connection reject message.

If the terminal's connection request is granted, the terminal enters a connected state. If the terminal is capable of supporting reception of the user service and transmission of feedback associated with the service, a point-to-multipoint downlink channel and a bi-directional point-to-point feedback channel are established. Preferably, the establishment a point-to-multipoint downlink channel and a bi-directional point-to-point feedback channel involve RRC connections. If the terminal's connection request is rejected, the terminal remains in an idle state.

In another aspect of the present invention, a terminal is provided for radio communication with a network. The terminal includes a transmitter, a display, a memory unit, a receiver and a processing unit.

The transmitter initiates a network connection process associated with a user service by transmitting a connection request to the network. The display conveys information to a user. The memory unit stores information related to network connections, the user service and capability of the terminal to provide feedback information associated with the service. The receiver receives a connection message from the network while the terminal is in the idle state and response messages from the network containing connection setup information and connection reject information. The processing unit performs the methods of the present invention to generate a response, including feedback capability information, to a connection message from the network.

In another aspect of the present invention, a network is provided for radio communication with a plurality of terminals. The terminal includes a receiver, a transmitter, a storage unit, and a controller.

The receiver receives connection requests, including feedback capability information and seeking a network connection associated with a user service, from the plurality of terminals. The transmitter transmits a connection message to a plurality of terminals subscribing to the service while the terminals are in an idle state. The storage unit stores information related to network connections, the user service and the capability of the terminals to provide feedback information associated with the service. The controller performs the methods of the present invention to select a predetermined threshold number of terminals with which to establish a network connection, the selection according to the terminals' capability to provide feedback such that network connections with terminals that are capable of providing feedback are given a higher priority than network connection with terminals that are not capable of providing feedback.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
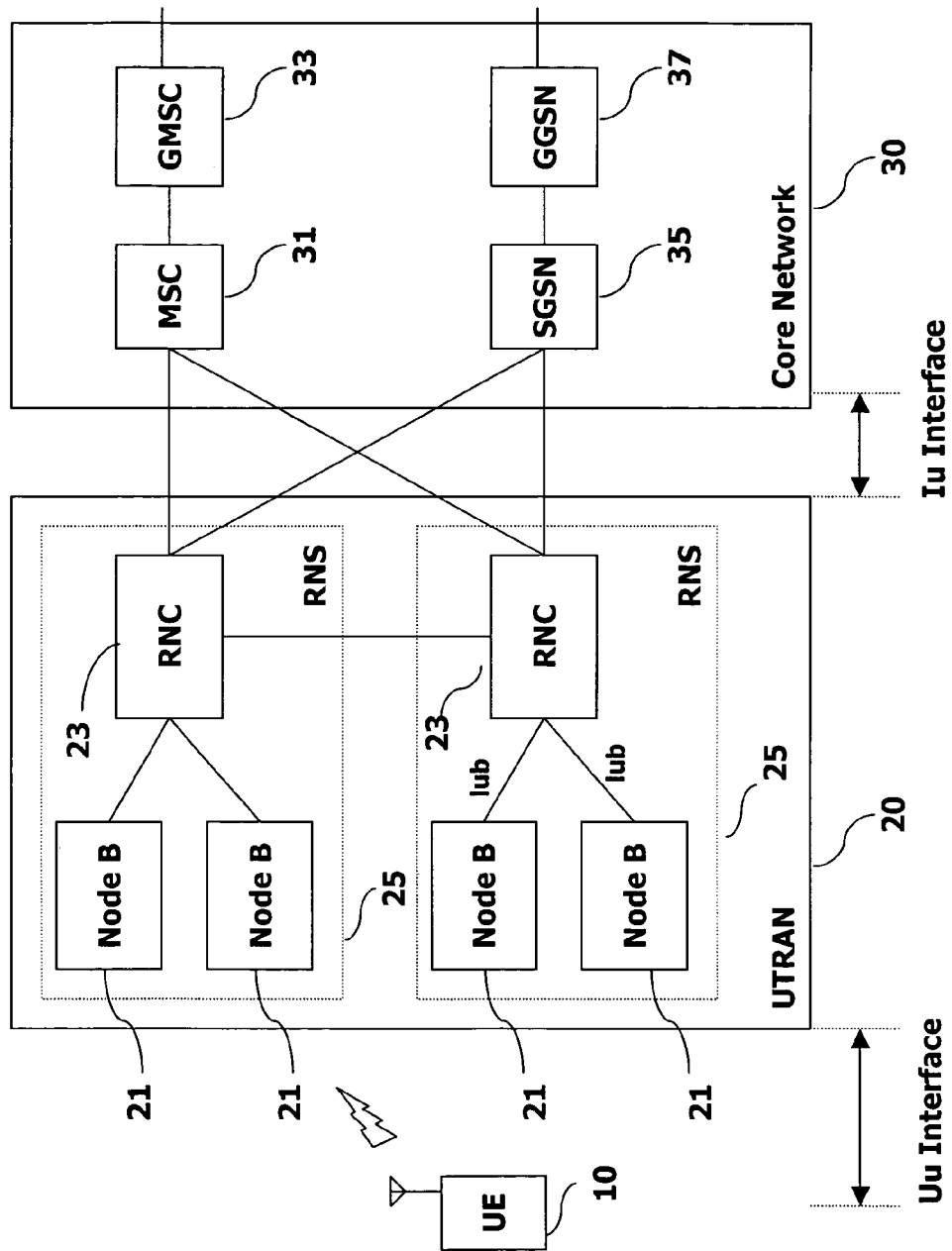
FIG. 1 illustrates a network structure of a general 3GPP UMTS system.
Figure 2:
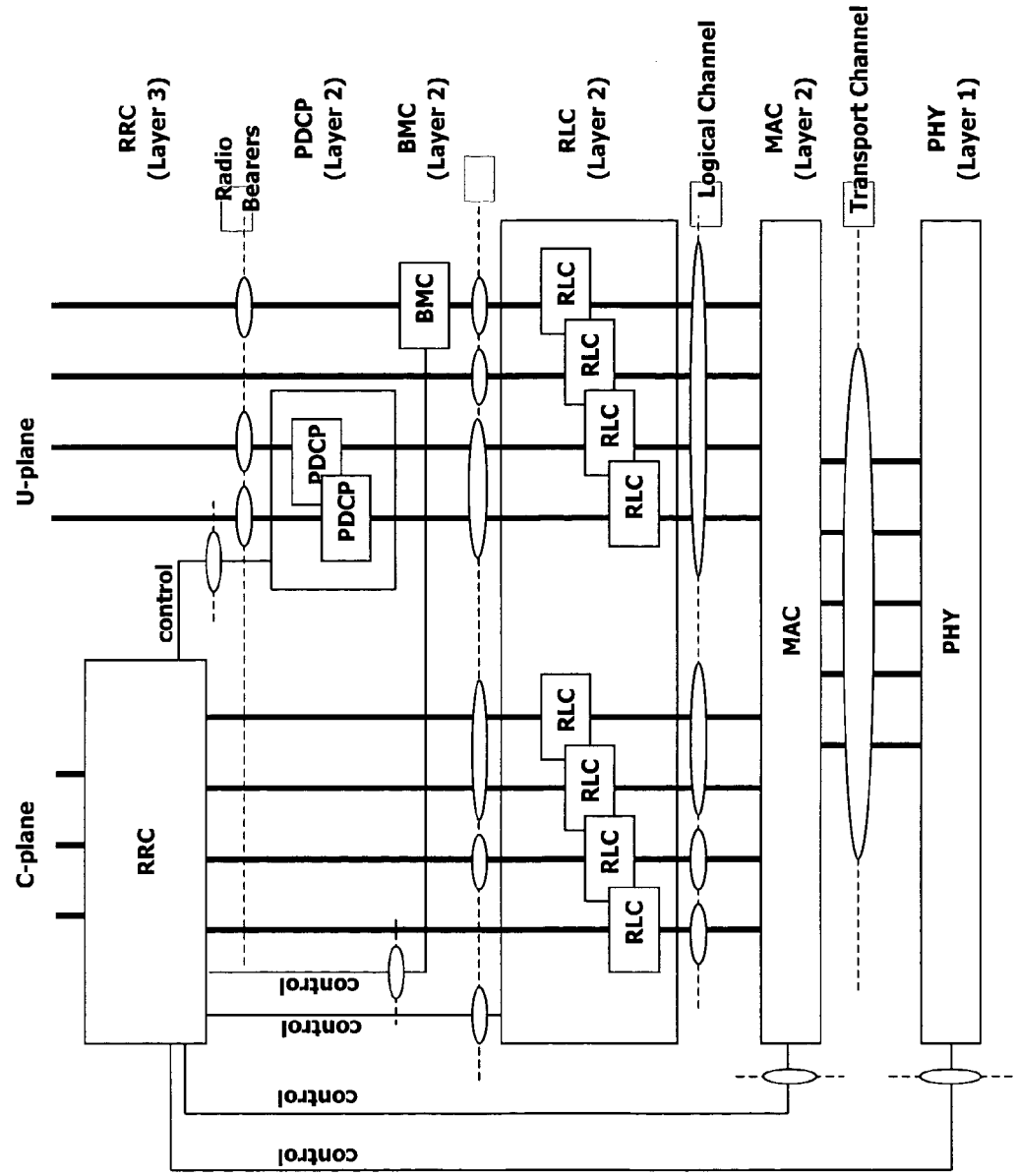
FIG. 2 illustrates an exemplary basic structure of a general UMTS network.
Figure 3:
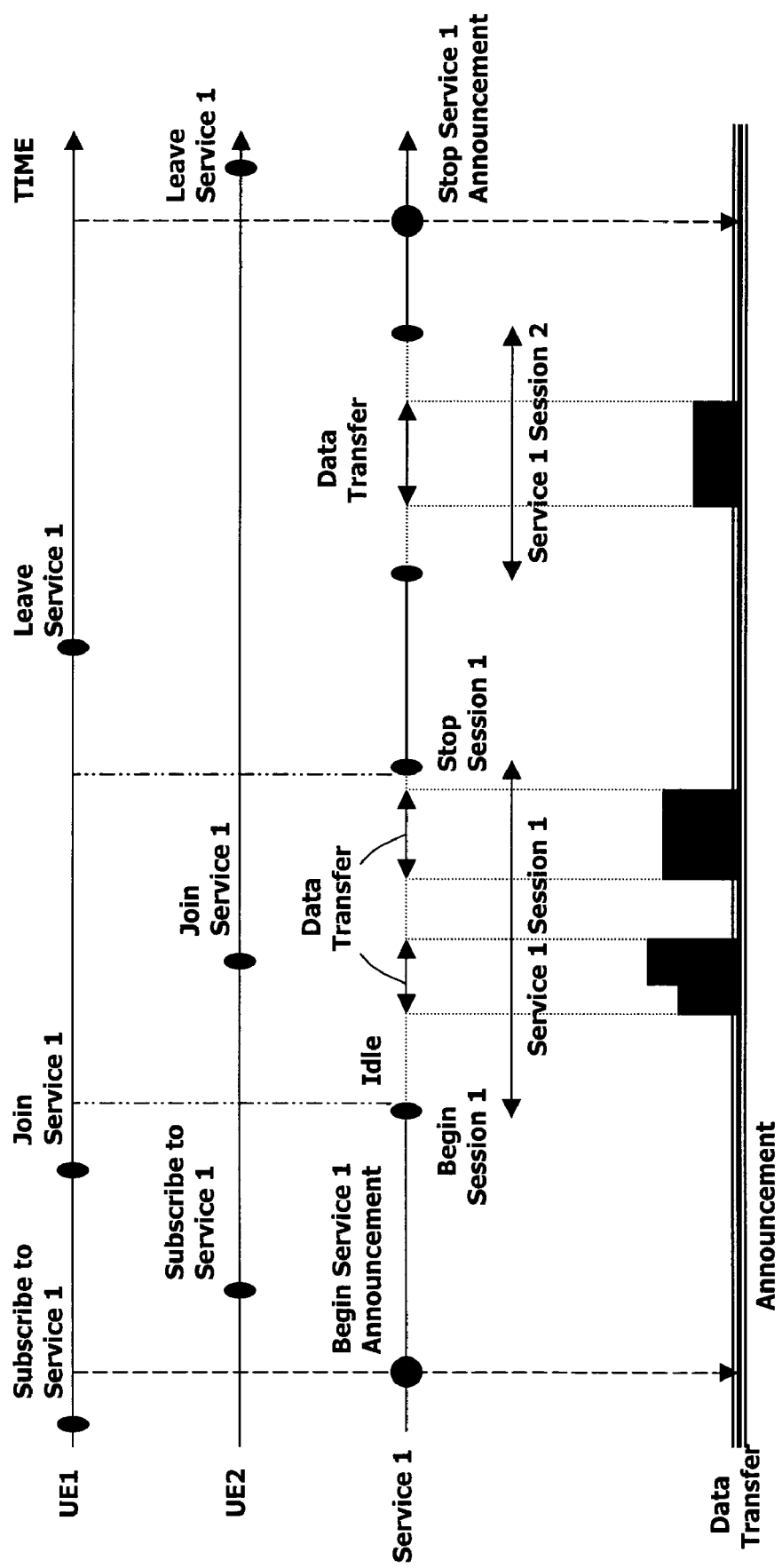
FIG. 3 illustrates a conventional art process of providing a particular MBMS service by using multicast mode.
Figure 4:
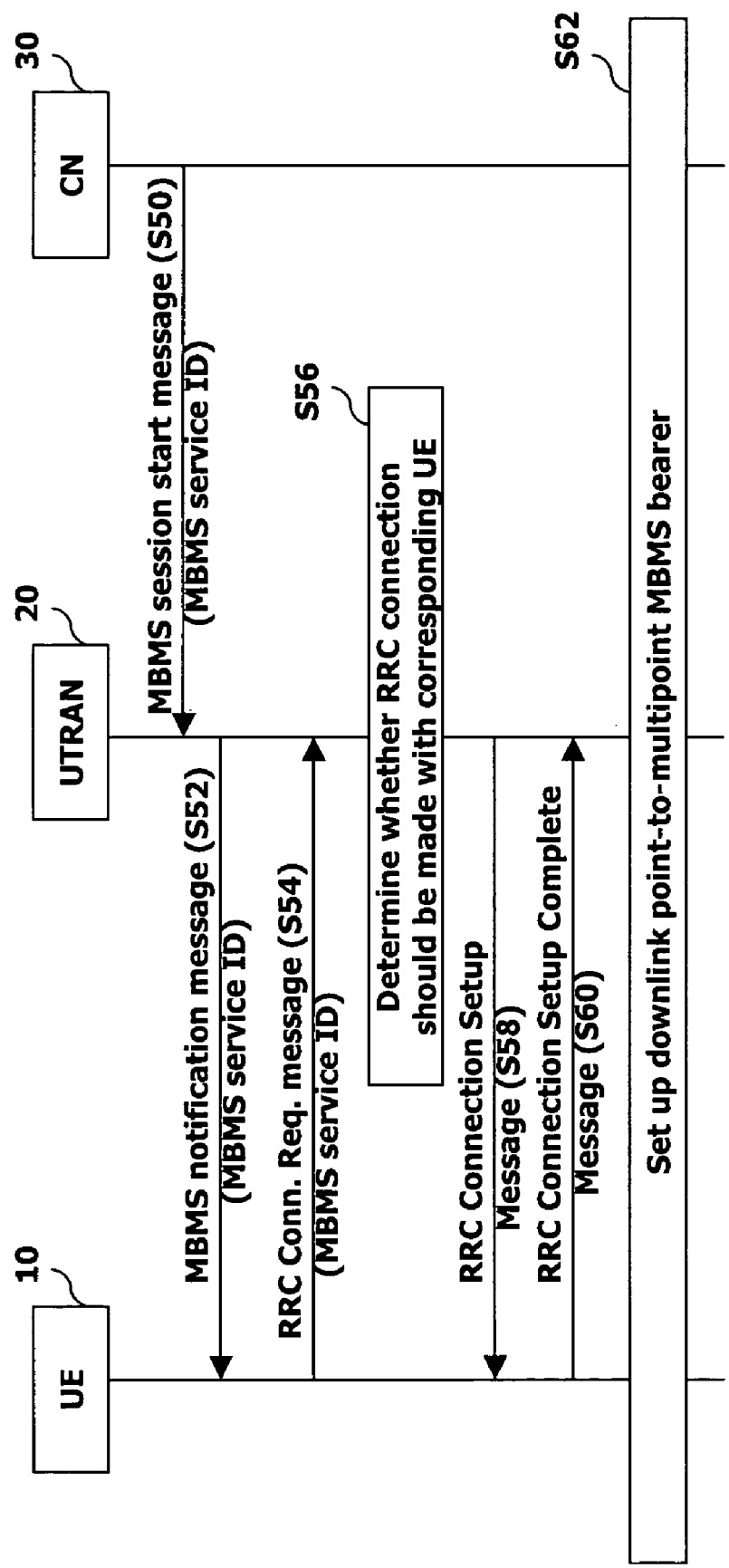
FIG. 4 illustrates the conventional art procedure when the UTRAN accepts the RRC connection request of a terminal.
Figure 5:
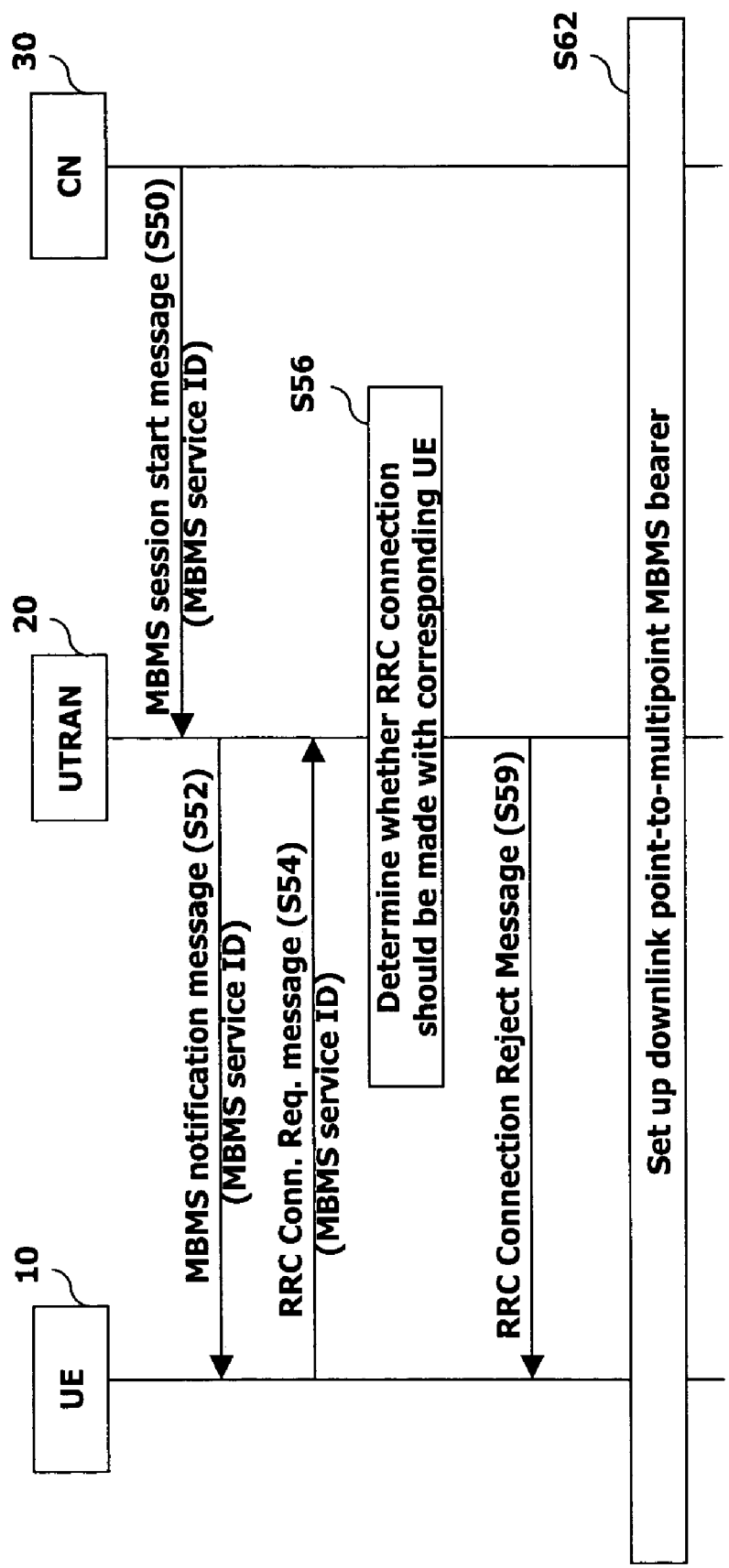
FIG. 5 illustrates the conventional art procedure when the UTRAN rejects the RRC connection request of a terminal.

The present invention relates to a method and apparatus for establishing feedback channels in an MBMS (multimedia broadcast/multicast service) for UMTS (Universal Mobile Telecommunication System) that facilitates selectively establishing an RRC connection with the terminals that are capable of transmitting uplink feedback information regarding the particular MBMS service. Although the present invention is illustrated with respect to a mobile communication system such as a UMTS developed by the 3GPP, and specifically an RRC connection associated with an MBMS user service, it is contemplated that the methods and apparatus described herein may also be applied to a communication system operating under similar and/or different standards when it is desired to selectively establish connections between a network and a plurality of terminals based on information regarding the terminals' capabilities.

The present invention provides a method and apparatus for a UTRAN 520 in a wireless radio communication system that transmits particular MBMS services to a plurality of terminals 410 and receives feedback information regarding the corresponding service from the terminals to selectively establish RRC connections by considering terminal capability information received from terminals. The present invention also provides a method and apparatus for a terminal 410 wishing to receive MBMS service from the UTRAN 520 to transmit terminal capability information to the UTRAN through the uplink via the RRC connection request message.

In the present invention, when establishing an RRC connection, a terminal 410 transmits an RRC connection message containing information related to an MBMS (multimedia broadcast/multicast service) to the UTRAN 520. The UTRAN 520 selectively establishes RRC connections with the terminal 410 according to the information related to the MBMS.

The UTRAN 520 may instruct the terminals 410 to send terminal capability information. The UTRAN 520 uses the terminal capability information transmitted from the terminals to selectively establish RRC connections with particular terminals, and not establish RRC connections with the remaining terminals.

The MBMS service is transmitted via a point-to-multipoint radio bearer and feedback information regarding the MBMS service is transmitted via a bi-directional point-topoint radio bearer. The feedback information may include RTCP packets, fee charging information, signal measuring information, data reception error rate, and/or any combination thereof.

Prior to transmitting an RRC connection setup message to a terminal 410, the UTRAN 520 needs to know whether the particular terminal is able to receive both a point-to-multipoint and a point-to-point radio bearer. The information indicating whether a particular terminal 410 can simultaneously support an MBMS service and its feedback information transmission service will be referred to as "simultaneous reception possible (SRP) information" and terminals 410 with SRP functions will be referred to as "SRP terminals."

Preferably, the SRP information refers to information indicating whether a particular terminal 410 is able to simultaneously receive both a downlink point-to-multipoint radio bearer for receiving MBMS service and a bi-directional point-to-point radio bearer for transmitting feedback information. The SRP information may be included in the terminal capability information of a particular terminal 410. Terminal capability information refers to the performance information related to the software and/or hardware of the particular terminal 410.

The UTRAN 520 limits the number of RRC connections with the terminals 410 that can receive a particular MBMS service. The UTRAN 520 may consider signaling overhead, internal system processing loads, and/or other factors in order to maintain the total number of RRC connections with terminals 410 that receive the MBMS service within a certain allowed threshold number of RRC connections.

The UTRAN 520 first determines whether each terminal 410 is able to provide feedback and then selectively establishes RRC connections to be within the threshold value. The UTRAN 520 first establishes RRC connections with those terminals 410 that are able to provide feedback. If the total number of terminals 410 that can provide feedback regarding the particular MBMS service is greater than the threshold value, the UTRAN 520 randomly selects terminals from those that can provide feedback so that the total number of terminals is equal the threshold value and establishes RRC connections with the selected terminals.

In another embodiment of the invention, if the total number of terminals 410 that can provide feedback regarding the particular MBMS service is greater than the threshold value, the UTRAN 520 considers a terminal class for those terminals 410 that are capable of feedback and selects those terminals having a relatively higher terminal class until the total number of terminals reaches the threshold value. The UTRAN 520 then establishes RRC connections with the selected terminals.

The terminal class may be an access class or an access service class. Either the core network 30 informs the UTRAN 520 of the class of each terminal 410 or each terminal may directly send their class information to the UTRAN. If a terminal 410 directly sends its class information to the UTRAN 520, the class information may be included in the terminal capability information.

Figure 6:
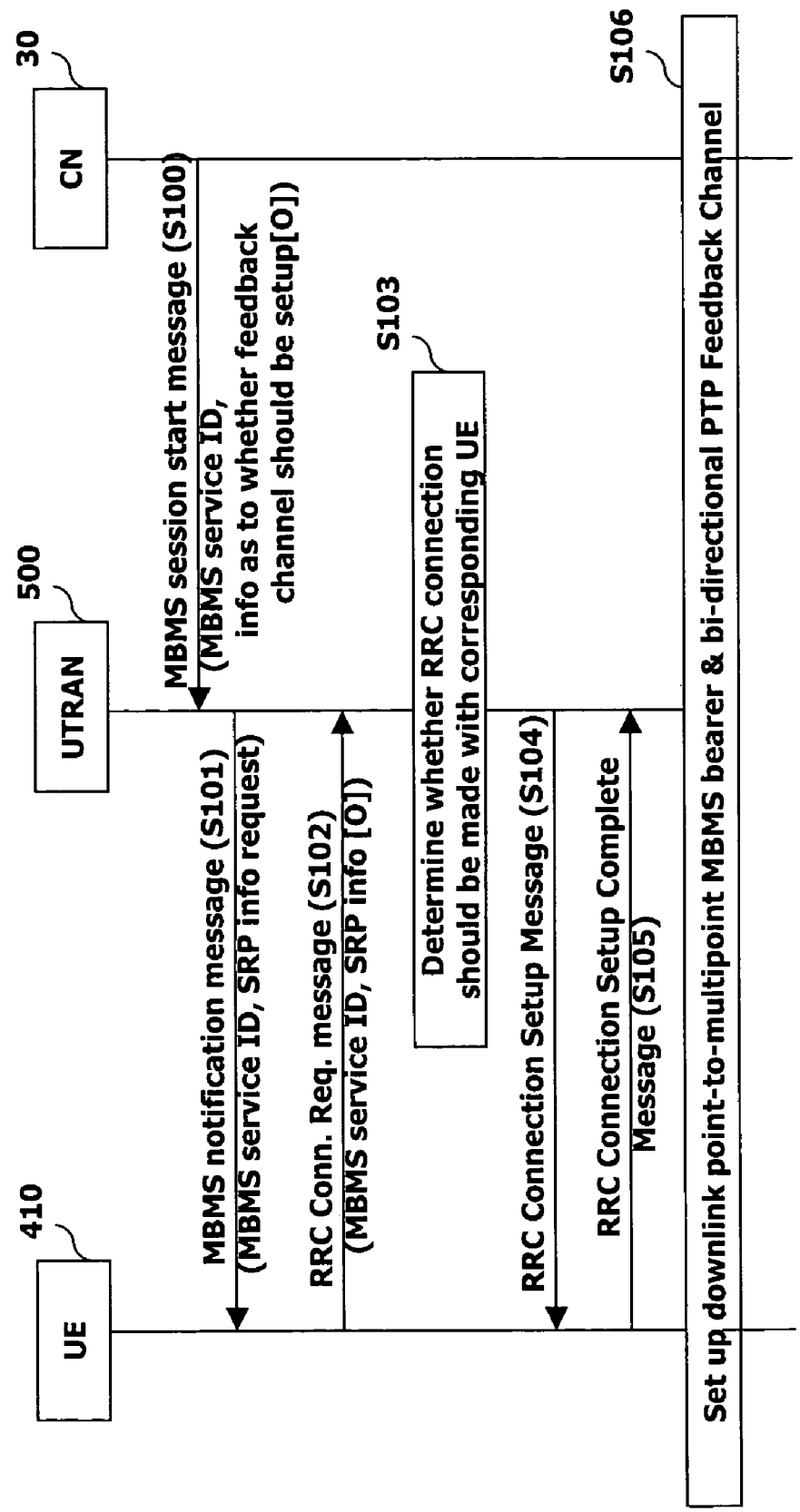
FIG. 6 illustrates the procedure when the UTRAN accepts the RRC connection request of a terminal according to a first embodiment of the present invention.

FIG. 6 illustrates an RRC connection procedure according to a first embodiment of the present invention when the RRC connection set up is successful. The UTRAN 520 first receives an MBMS session start message from the core network 30 in step S100. This message informs the UTRAN 520 of the MBMS service ID and indicates that a feedback channel for that service needs to be established.

The UTRAN 520 transmits MBMS notification messages to the terminals 410 that wish to receive the MBMS service. If a feedback channel is needed for the MBMS service, the UTRAN 520 uses the MBMS notification message to request SRP (simultaneous reception possible) information in step S101. The MBMS notification message includes an MBMS service ID.

Each of the terminals 410 that receive the MBMS notification message then transmits an RRC connection request message to the UTRAN 520 in step S102. If the UTRAN 520 requested SRP information, the terminals 410 use the RRC connection request message to inform the UTRAN of the MBMS service ID and the SRP information.

The UTRAN 520 limits the number of RRC connections with the terminals 410 that receive a particular MBMS service. The UTRAN 520 may consider signaling overhead, internal system processing loads, and/or other factors to maintain the total number of RRC connections with terminals 410 that receive the MBMS service below a certain allowed threshold value. Therefore, the UTRAN 520 establishes RRC connections with only a certain number of terminals 410. To achieve this, the UTRAN 520 utilizes the SRP information transmitted from the terminals 410 to determine whether to establish RRC connections with a particular terminal in step S103. In general, if a terminal 410 is capable of simultaneous reception, the UTRAN 520 selects the terminal for an RRC connection.

If the number of SRP terminals 410 exceeds the threshold value, the UTRAN 520 randomly or sequentially, for example on a first-come-first-served basis, selects a number of terminals to equal the threshold value and establishes RRC connections with the selected terminals. However, if the total number of SRP terminals 410 is less than the threshold value, the UTRAN 520 randomly selects among those terminals that are not SRP terminals so that the total number of terminals with which an RRC connection is established reaches the threshold value.

After selecting terminals 410 for RRC connection, the UTRAN 520 transmits RRC connection request messages to the selected terminals 410 in step S104. Each terminal 410 receiving an RRC connection request message then transmits an RRC connection setup complete message to the UTRAN 520 in step S105. If the steps are successfully completed, an RRC connection exists between the corresponding terminal 410 and the UTRAN 520, and the corresponding terminal is in RRC connected state.

The UTRAN 520 allows all terminals 410 wishing to receive an MBMS service, consisting of all terminals in RRC connected state and all terminals in idle state, to establish point-to-multipoint MBMS bearers in step S106. The UTRAN 520 also establishes a point-to-point feedback channel with the SRP terminals 410 among those terminals in RRC connected state. Since an SRP terminal 410 is in RRC connected state, a point-to-multipoint MBMS bearer and a point-to-point feedback channel is established.

Figure 7:
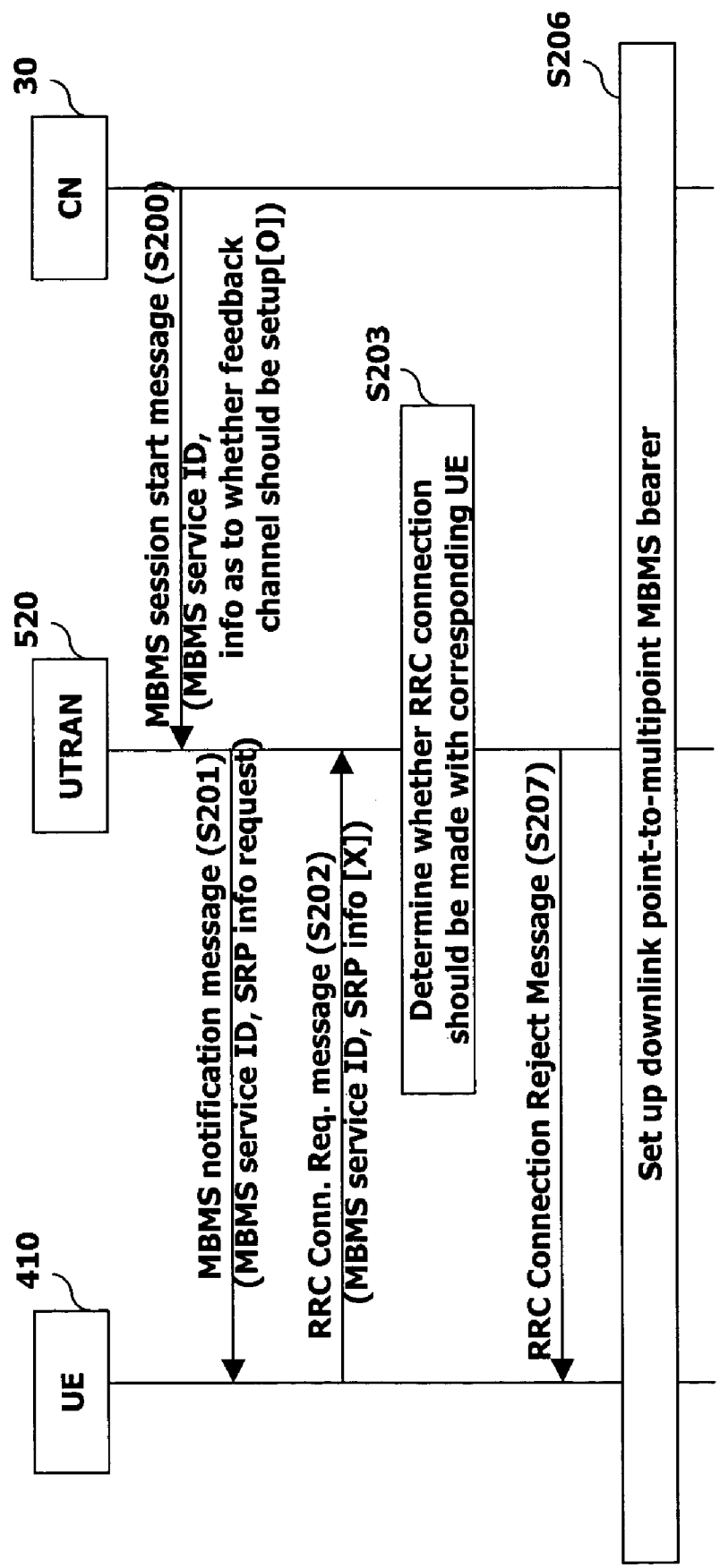
FIG. 7 illustrates the procedure when the UTRAN rejects the RRC connection request of a terminal according to a first embodiment of the present invention.

FIG. 7 illustrates an RRC connection procedure according to a first embodiment of the present invention when RRC connection setup is not successful. The UTRAN 520 first receives an MBMS session start message from the core network 30 in step S200. This message informs the UTRAN 520 of the MBMS service ID and indicates that a feedback channel for that service needs to be established.

The UTRAN 520 transmits MBMS notification messages to the terminals 410 that wish to receive the MBMS service. If a feedback channel is needed for the MBMS service, the UTRAN 520 uses the MBMS notification message to request SRP information in step S201. The MBMS notification message includes an MBMS service ID.

Each of the terminals 410 that receive the MBMS notification message then transmits an RRC connection request message to the UTRAN 520 in step S202. If the UTRAN 520 requested SRP information, the terminals 410 use the RRC connection request message to inform the UTRAN of the MBMS service ID and the SRP information.

The UTRAN 520 utilizes the SRP information transmitted from the terminals 410 to determine whether to establish RRC connections with a particular terminal in step S203. In general, if a terminal 410 is capable of simultaneous reception, the UTRAN 520 selects the terminal for an RRC connection.

If the number of SRP terminals 410 exceeds the threshold value, the UTRAN 520 randomly or sequentially, for example on a first-come-first-served basis, selects a number of terminals to equal the threshold value and establishes RRC connections with the selected terminals. However, if the total number of SRP terminals 410 is less than the threshold value, the UTRAN 520 randomly selects among those terminals that are not SRP terminals so that the total number of terminals with which an RRC connection is established reaches the threshold value.

After selecting terminals 410 for RRC connection, the UTRAN 520 transmits RRC connection reject messages to the non-selected terminals 410 in step S207. Each terminal 410 receiving an RRC reject request message remains in an idle state.

The UTRAN 520 allows all terminals 410 wishing to receive an MBMS service, consisting of all terminals in RRC connected state and all terminals in idle state, to establish point-to-multipoint MBMS bearers in step S206. The UTRAN 520 establishes a point-to-multipoint point MBMS bearer, but not a point-to-point feedback channel may be established with the terminals 410 in idle state.

Figure 8:
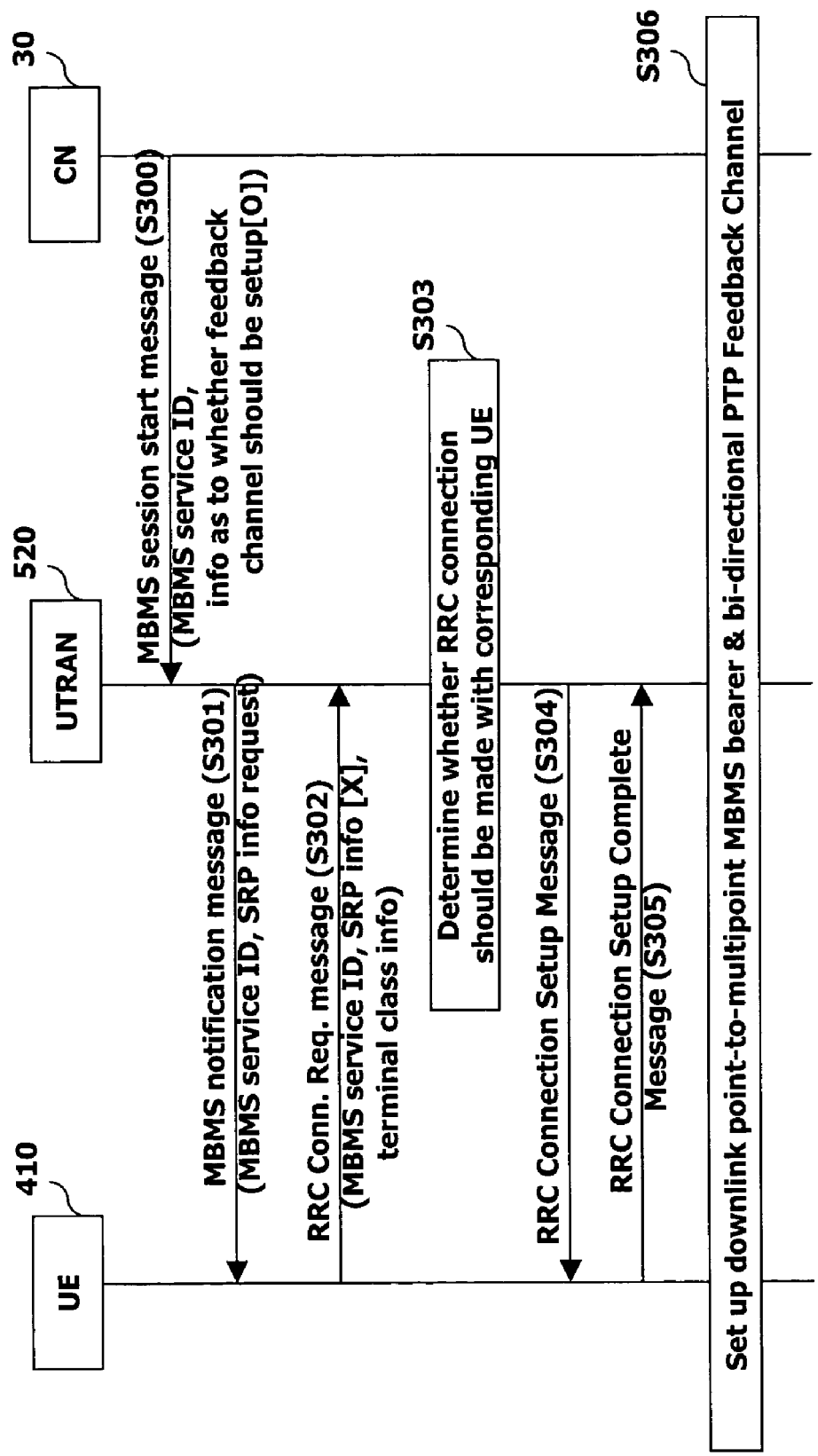
FIG. 8 illustrates the procedure when the UTRAN accepts the RRC connection request of a terminal according to a second embodiment of the present invention.
Figure 9:
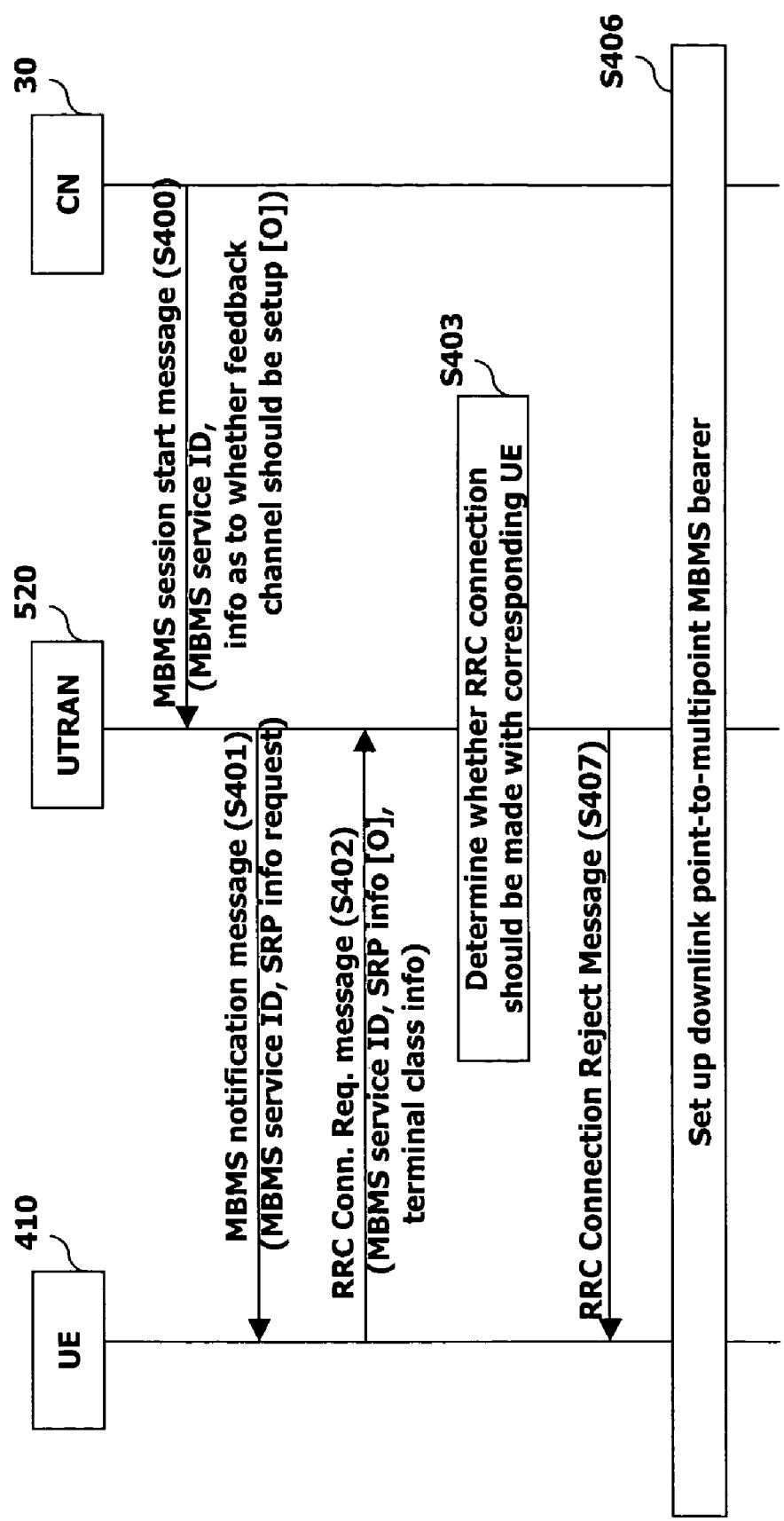
FIG. 9 illustrates the procedure when the UTRAN rejects the RRC connection request of a terminal according to a second embodiment of the present invention.

In a second embodiment of the invention illustrated in FIGS. 8 and 9, the procedures are almost identical to those of the first embodiment illustrated in FIGS. 6 and 7. The embodiment illustrated in FIGS. 8 and 9 differs from the embodiment illustrated in FIGS. 6 and 7 in that terminal class information is considered when selection terminal 410 for RRC connection.

FIG. 8 illustrates an RRC connection procedure, similar to that illustrated in FIG. 6, when the RRC connection set up is successful and terminal class information is considered. FIG. 9 illustrates an RRC connection procedure, similar to that illustrated in FIG. 7, when the RRC connection set up is not successful and terminal class information is considered.

As illustrated in FIG. 8, after receiving an MBMS session start message from the core network 30 in step S300, the UTRAN 520 transmits a MBMS notification message to those terminals 410 wishing to receive the MBMS service, and requests their SRP information in step S301. Each of the terminals 410 that receive the MBMS notification message then transmits an RRC connection request message to the UTRAN 520 in step S302.

In a preferred embodiment, the RRC connection request message includes an MBMS service ID, SRP information, and class information of the terminal 410. However, it is contemplated that the terminal class information may be received from the core network 30.

Based upon the SRP information, the UTRAN 520 establishes RRC connections with a certain number of terminals 410 below the threshold value. To achieve this, the UTRAN 520 utilizes the SRP information transmitted by the terminals 410 to determine whether to establish RRC connections with a particular terminal in step S303.

If the number of SRP terminals 410 is less than the threshold value, the UTRAN 520 selects for RRC connection, from among those terminals that are not SRP terminals, a certain number of terminals having relatively high terminal class so that the total number of terminals with which an RRC connection is established reaches the threshold value. Therefore, when the total number of SRP terminals 410 is less than the threshold value, the UTRAN 520 establishes RRC connections with some non-SRP terminals that have a terminal class relatively higher than the terminal class of other non-SRP terminals.

If the number of SRP terminals 410 is greater than the threshold value, the UTRAN 520 selects for RRC connection, from among those terminals that are SRP terminals, a certain number of terminals having relatively high terminal class so that the total number of terminals with which an RRC connection is established reaches the threshold value. Therefore, when the total number of SRP terminals 410 is greater than the threshold value, the UTRAN 520 establishes RRC connections with those SRP terminals that have a terminal class relatively higher than the terminal class of other SRP terminals.

After selecting terminals 410 for RRC connection, the UTRAN 520 transmits RRC connection request messages to the selected terminals 410 in step S304. Each terminal 410 receiving an RRC connection request message then transmits an RRC connection setup complete message to the UTRAN 520 in step S305. If the steps are successfully completed, an RRC connection exists between the corresponding terminal 410 and the UTRAN 520, and the corresponding terminal is in RRC connected state.

The UTRAN 520 allows all terminals 410 wishing to receive an MBMS service, consisting of all terminals in RRC connected state and all terminals in idle state, to establish point-to-multipoint MBMS bearers in step S306. The UTRAN 520 also establishes a point-to-point feedback channel with the SRP terminals 410 among those terminals in RRC connected state. Since an SRP terminal 410 is in RRC connected state, a point-to-multipoint MBMS bearer and a point-to-point feedback channel is established As illustrated in FIG. 9, after receiving an MBMS session start message from the core network 30 in step S400, the UTRAN 520 transmits a MBMS notification message to those terminals 410 wishing to receive the MBMS service, and requests their SRP information in step S401. Each of the terminals 410 that receive the MBMS notification message then transmits an RRC connection request message to the UTRAN 520 in step S402.

In a preferred embodiment, the RRC connection request message includes an MBMS service ID, SRP information, and class information of the terminal 410. However, it is contemplated that the terminal class information may be received from the core network 30.

Based upon the SRP information, the UTRAN 520 establishes RRC connections with a certain number of terminals 410 below the threshold value. To achieve this, the UTRAN 520 utilizes the SRP information transmitted by the terminals 410 to determine whether to establish RRC connections with a particular terminal in step S403.

If the number of SRP terminals 410 is less than the threshold value, the UTRAN 520 selects for RRC connection, from among those terminals that are not SRP terminals, a certain number of terminals having relatively high terminal class so that the total number of terminals with which an RRC connection is established reaches the threshold value. Therefore, when the total number of SRP terminals 410 is less than the threshold value, the UTRAN 520 establishes RRC connections with some non-SRP terminals that have a terminal class relatively higher than the terminal class of other non-SRP terminals.

If the number of SRP terminals 410 is greater than the threshold value, the UTRAN 520 selects for RRC connection, from among those terminals that are SRP terminals, a certain number of terminals having relatively high terminal class so that the total number of terminals with which an RRC connection is established reaches the threshold value. Therefore, when the total number of SRP terminals 410 is greater than the threshold value, the UTRAN 520 establishes RRC connections with those SRP terminals that have a terminal class relatively higher than the terminal class of other SRP terminals.

After selecting terminals 410 for RRC connection, the UTRAN 520 transmits RRC connection reject messages to the non-selected terminals 410 in step S407. Each terminal 410 receiving an RRC reject request message remains in an idle state.

The UTRAN 520 allows all terminals 410 wishing to receive an MBMS service, consisting of all terminals in RRC connected state and all terminals in idle state, to establish point-to-multipoint MBMS bearers in step S406. The UTRAN 520 establishes a point-to-multipoint point MBMS bearer, but not a point-to-point feedback channel, with the terminals 410 in idle state.

In FIGS. 4 to 9 described herein, an MBMS service ID is shown to be included in the RRC connection request message. However, as MBMS technology continues to be developed, various issues and potential problems are being identified and addressed. Recently, it has been found that including the MBMS identification in the RRC connection request that is sent from a UE 410 to the UTRAN 520 may result in security problems, specifically the potential of MBMS ID theft. Therefore, it has been suggested that the MBMS ID itself not be transmitted frequently, but preferably, that the RRC connection request message should only include a general indication that the RRC connection is to be used for MBMS. The procedures illustrated in FIGS. 6 to 9 may be adapted to include only a general indication that the RRC connection is to be used for MBMS instead of the MBMS ID.

Figure 10:
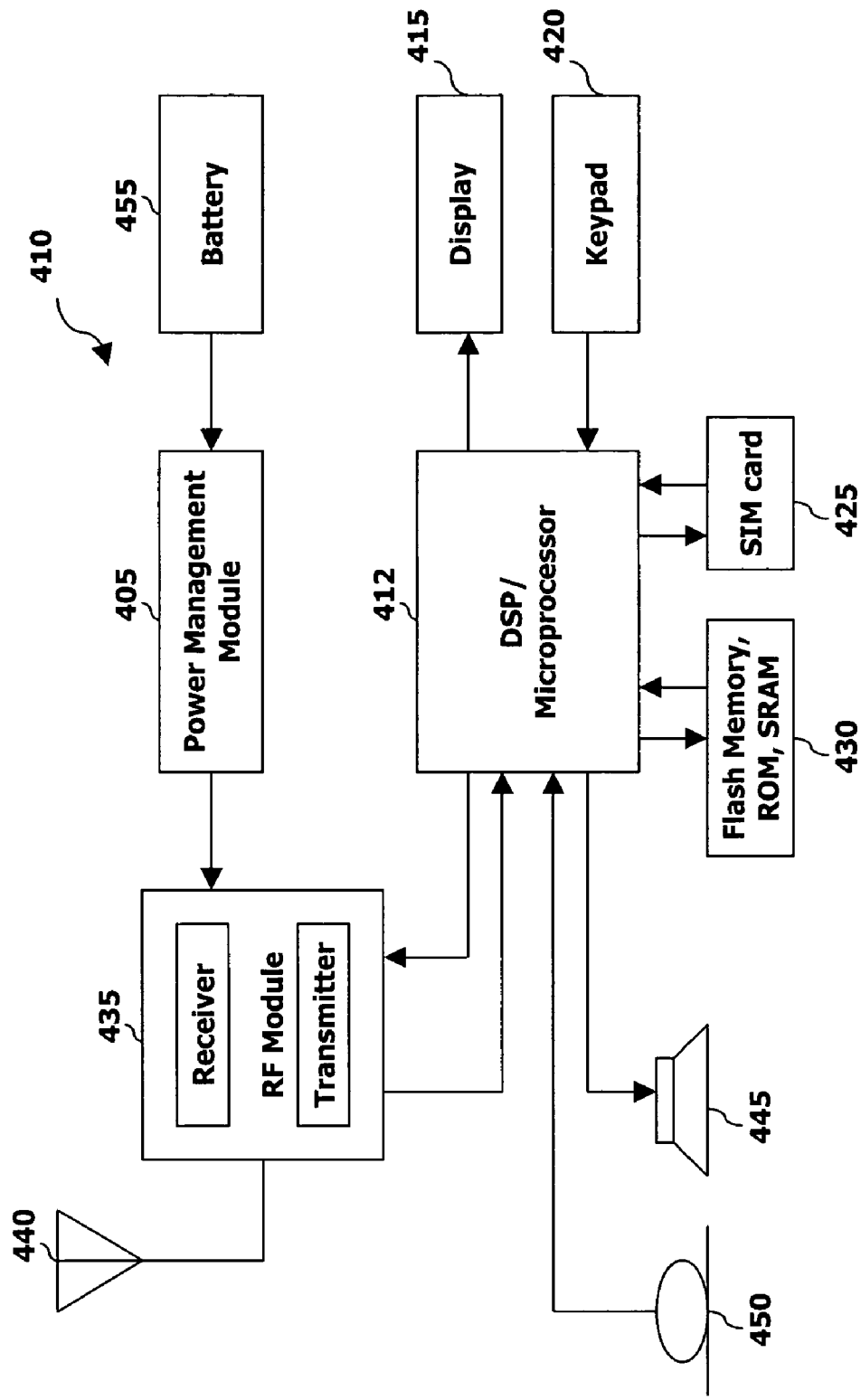
FIG. 10 illustrates a terminal for generating RRC connection request messages including feedback capability information and processing RRC connection setup messages according to one embodiment of the present invention.

FIG. 10 illustrates a block diagram of a terminal 410 according to the preferred embodiment of the present invention. The terminal 410 comprises a processor or digital signal processor 412, RF module 435, power management module 405, antenna 440, battery 455, display 415, keypad 420, memory 430, SIM card 425 (which may be optional), speaker 445 and microphone 450.

A user enters instructional information, such as a telephone number, for example, by pushing the buttons of a keypad 420 or by voice activation using the microphone 450. The processor 412 receives and processes the instructional information to perform the appropriate function, such as to dial the telephone number. Operational data may be retrieved from the Subscriber Identity Module (SIM) card 425 or the memory module 430 to perform the function. Furthermore, the processor 412 may display the instructional and operational information on the display 415 for the user's reference and convenience. Moreover, the processor 412 is adapted to perform the procedures illustrated in FIGS. 6 to 9.

The processor 412 issues instructional information to the RF module 435, to initiate communication, for example, transmit radio signals comprising voice communication data or transmit an RRC connection request message as described herein. The RF module 435 comprises a receiver and a transmitter to receive and transmit radio signals. An antenna 440 facilitates the transmission and reception of radio signals. Upon receiving radio signals such as an MBMS notification message, RRC connection setup message or RRC connection reject message from the network as described herein, the RF module 435 may forward and convert the signals to baseband frequency for processing by the processor 412. The processed signals may also be transformed into audible or readable information outputted via the speaker 445, for example if the radio signals are an incoming phone call.

Figure 11:
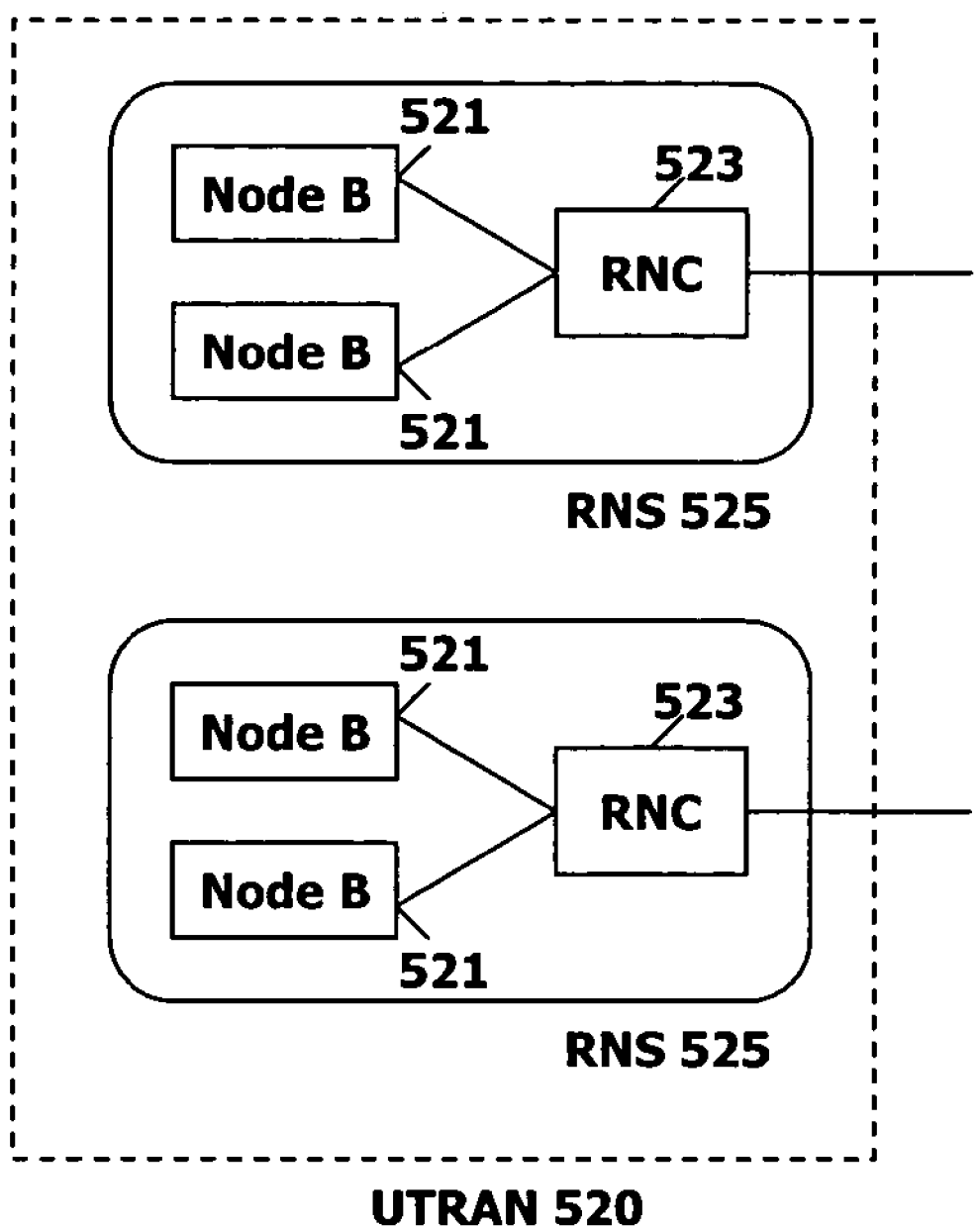
FIG. 11 illustrates a network for processing RRC connection request messages including feedback capability information and transmitting RRC connection setup messages according to one embodiment of the present invention.

FIG. 11 illustrates a block diagram of a UTRAN 520 according to the preferred embodiment of the present invention. The UTRAN 520 includes one or more radio network sub-systems (RNS) 525. Each RNS 525 includes a radio network controller (RNC) 523 and a plurality of Node-Bs (base stations) 521 managed by the RNC. The RNC 523 handles the assignment and management of radio resources and operates as an access point with respect to the core network 30. Furthermore, the RNC 523 is adapted to perform the procedures illustrated in FIGS. 6 to 9.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410.

As described herein, the present invention allows a terminal 410 to inform the UTRAN 520 whether both a point-to-multipoint radio bearer and a point-to-point radio bearer can be received, and to optionally indicate its terminal class information by using the RRC connection request message. Based upon this information, the UTRAN 520 selects those terminals 410 with which an RRC connection should be established, thereby maximizing the number of terminals that transmit feedback information regarding a particular MBMS service. In particular, the feedback information transmitted by the terminals 410 of high-end users may always be given priority when establishing RRC connections.

It will be apparent to one skilled in the art that the preferred embodiments of the present invention can be readily implemented using, for example, the processor 412 or other data or digital processing device, either alone or in combination with external support logic.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of communicating with a network in a wireless communication system, the method performed by a terminal and comprising the steps of:
   receiving a first connection message by the terminal subscribing to a service while in an idle state;
   transmitting a connection request message to the network to request a connection response message, wherein the connection request message is a first response to the first connection message and comprises feedback capability information indicating whether the terminal is capable of supporting reception of the service and transmission of feedback associated with the service; and
   receiving the connection response message from the network.

2. The method of claim 1, wherein the first connection message is associated with the service and requests feedback capability information associated with the terminal.

3. The method of claim 1, wherein the first connection message is an MBMS notification message.

4. The method of claim 1, wherein the connection request message is associated with the service.

5. The method of claim 1, wherein the connection request message is an RRC connection request message.

6. The method of claim 1, wherein the connection request message further comprises terminal class information.

7. The method of claim 1, wherein, the connection response message comprises one of connection setup information and connection reject information.

8. The method of claim 1, wherein, the connection response message is one of an RRC connection setup message and an RRC connection reject message.

9. The method of claim 1, further comprising one of entering a connected state and maintaining the idle state, wherein the connected state is entered if the connection response message comprises connection setup information and the idle state is maintained if the connection response message comprises connection reject information.

10. The method of claim 9, wherein the connected state comprises establishing a point-to-multipoint downlink channel and a bi-directional point-to-point feedback channel with the network.

11. The method of claim 10, wherein establishing a point-to-multipoint downlink channel and a bi-directional point-to-point feedback channel comprises an RRC connection.

12. The method of claim 1, wherein the service is a point-to-multipoint service.

13. The method of claim 1, further comprising:
   initiating a control plane connection procedure by transmitting the connection request message to the network to request a connection response message, wherein the connection request message comprises terminal capability information indicating whether the terminal is capable of supporting reception of multiple channels.

14. A method of communicating with terminals in a wireless communication system, the method comprising the steps of:
   transmitting a first connection message to a plurality of terminals subscribing to a service while the terminals are in an idle state;
   receiving connection request messages from the plurality of terminals, the connection request message requesting a connection response message and comprising one of positive feedback capability information and negative feedback capability information, wherein positive feed back capability information indicates the terminal is capable of supporting reception of the service and transmission of feedback associated with the service and negative feedback capability information indicates the terminal is not capable of supporting reception of the service and transmission of feedback associated with the service;
   selecting a predetermined number of the plurality of terminals to receive a connection response message comprising connection setup information, wherein each terminal that sent positive feedback capability information is selected if the number of terminals that sent positive feedback capability information is not greater than the predetermined number and no terminal that sent negative feedback capability information is selected if the number of terminals that sent positive feedback capability information is one of greater than and equal to the predetermined number; and
   transmitting a connection response message comprising connection setup information to the selected terminals.

15. The method of claim 14, wherein, if the number of terminals that sent positive feedback capability information is less than the predetermined value, the step of selecting a predetermined number of the plurality of terminals further comprises selecting at least one terminal that sent negative feedback capability information.

16. The method of claim 15, wherein the at least one terminal that sent negative feedback capability information is selected at random.

17. The method of claim 15, wherein the at least one terminal that sent negative feedback capability information is selected sequentially.

18. The method of claim 15, wherein selecting at least one terminal that sent negative feedback capability information further comprises the steps of:
   ranking the terminals that sent negative feedback capability information according to terminal class information; and
   selecting at least one terminal that sent negative feedback capability information, wherein the rank of the lowest-ranked terminal that sent negative feedback capability information which is selected is one of higher than and equal to the rank of the highest-ranked terminal that sent negative feedback capability information which is not selected.

19. The method of claim 14, wherein, if the number of terminals that sent positive feedback capability information is greater than the predetermined value, the step of selecting a predetermined number of the plurality of terminals further comprises selecting only terminals that sent positive feedback capability information.

20. The method of claim 19, wherein the terminals that sent positive feedback capability information are selected at random.

21. The method of claim 19, wherein the terminals that sent positive feed back capability information are selected sequentially.

22. The method of claim 19, wherein selecting only terminals that sent positive feedback capability information further comprises the steps of:
   ranking the terminals that sent positive feedback capability information according to terminal class information; and
   selecting terminals that sent positive feedback capability information, wherein the rank of the lowest-ranked terminal selected is one of higher than and equal to the rank of the highest-ranked terminal that sent positive feedback capability information which is not selected.

23. The method of claim 14, wherein the connection request message further comprises terminal class information.

24. The method of claim 14, further comprising receiving terminal class information from a core network.

25. The method of claim 14, further comprising transmitting a connection response message comprising connection reject information to each non-selected terminal.

26. The method of claim 25, wherein, the connection response message comprising connection reject information is an RRC connection reject message.

27. The method of claim 14, further comprising establishing a point-to-multipoint downlink channel and a bi-directional point-to-point feedback channel with at least one selected terminal.

28. The method of claim 27, wherein establishing a point-to-multipoint downlink channel and a bi-directional point-to-point feedback channel comprises an RRC connection.

29. The method of claim 14, wherein each connection request message is associated with the service.

30. The method of claim 14, wherein each connection request message is an RRC connection request message.

31. The method of claim 14, wherein the service is a point-to-multipoint service.

32. The method of claim 14, wherein the first connection message is associated with the service and requests feedback capability information associated with the terminal.

33. The method of claim 14, wherein the first connection message is an MBMS notification message.

34. The method of claim 14, wherein, the connection response message comprising connection setup information is an RRC connection setup message.

35. A terminal for communicating with a network in a mobile communication system, the terminal comprising:
   a transmitter adapted to initiate a network connection process associated with a user service by transmitting a connection request message to the network;
   a display adapted to convey information to a user;
   a memory unit adapted to store information related to feedback capability, the user service and network connections;
   a receiver adapted to receive a first connection message while the terminal is in an idle state and connection response messages comprising one of connection setup information and connection reject information; and
   a processing unit adapted to generate the connection request message as a first response to the first connection message, the connection request message requesting a connection response message and comprising feedback capability information indicating whether the terminal is capable of supporting reception of the service and transmission of feedback associated with the service.

36. A network for radio communication with a plurality of terminals in a mobile communication system, the network comprising:
   a receiver adapted to receive connection request messages from a plurality of terminals subscribing to a service, the connection request messages requesting a connection response message and comprising one of positive feed back capability information and negative feedback capability information, wherein positive feedback capability information indicates the terminal is capable of supporting reception of the service and transmission of feedback associated with the service and negative feedback capability information indicates the terminal is not capable of supporting reception of the service and transmission of feedback associated with the service;
   a transmitter adapted to transmit a first connection message to a plurality of terminals subscribing to the service while the terminals are in an idle state;
   a storage unit adapted to store information related to feedback capability, the user service and network connections; and
   a controller adapted to evaluate the positive feedback capability information and negative feedback capability information in the connection request messages to select a predetermined number of terminals with which to establish a communication connection, wherein each terminal that sent positive feedback capability information is selected if the number of terminals that sent positive feedback capability information is not greater than the predetermined number and no terminal that sent negative feedback capability information is selected if the number of terminals that sent positive feedback capability information is one of greater than and equal to the predetermined number.

* * * * *